*US009100084B2*

United States Patent
Kapoor et al.

(10) Patent No.: US 9,100,084 B2
(45) Date of Patent: Aug. 4, 2015

(54) SYNCHRONIZING AND DETECTING INTERFERENCE IN WIRELESS RECEIVER

(75) Inventors: Ajay Kapoor, Wijchen (NL); Maurice Stassen, Eindhoven (NL)

(73) Assignee: ST-ERICSSON SA, Plan-Les-Ouates (CH)

( * ) Notice: Subject to any disclaimer, the term of this patent is extended or adjusted under 35 U.S.C. 154(b) by 206 days.

(21) Appl. No.: 13/808,987

(22) PCT Filed: Jun. 29, 2011

(86) PCT No.: PCT/EP2011/060900
§ 371 (c)(1),
(2), (4) Date: Jan. 8, 2013

(87) PCT Pub. No.: WO2012/007278
PCT Pub. Date: Jan. 19, 2012

(65) Prior Publication Data
US 2013/0115904 A1   May 9, 2013

Related U.S. Application Data

(60) Provisional application No. 61/368,359, filed on Jul. 28, 2010.

(30) Foreign Application Priority Data

Jul. 13, 2010 (EP) .................................. 10169422

(51) Int. Cl.
*H04B 1/06* (2006.01)
*H04B 7/00* (2006.01)
(Continued)

(52) U.S. Cl.
CPC .................. *H04B 1/16* (2013.01); *H04B 1/109* (2013.01); *H04B 1/1036* (2013.01)

(58) Field of Classification Search
CPC ........ H04B 1/1036; H04B 1/16; H04B 1/109; H04L 27/2647; H04K 3/228
USPC ................................................ 455/234.1, 296
See application file for complete search history.

(56) References Cited

U.S. PATENT DOCUMENTS

| 6,975,673 B1 | 12/2005 | Rouquette |
| 2005/0018750 A1 | 1/2005 | Foerster et al. |
| 2008/0143580 A1* | 6/2008 | Glazko et al. ................... 342/17 |

FOREIGN PATENT DOCUMENTS

| EP | 1 959 625 A1 | 8/2008 |
| EP | 2 096 769 A1 | 9/2009 |
| WO | 2009/114123 A2 | 9/2009 |

OTHER PUBLICATIONS

Divi Gupta and Dev V. Gupta, Low Data Rate Frequncy-Shifted Reference Ultra-Wideband Communication System, pp. 1-49.*

(Continued)

*Primary Examiner* — Christian Hannon
(74) *Attorney, Agent, or Firm* — Patent Portfolio Builders PLLC (57) ABSTRACT

Interference detection involves detecting the interference component in the received signal if there is such a component, controlling a band reject filter according to the detected interference component to filter the received signal to suppress the interference component, and synchronizing the receiver to the received signal, wherein the step of detecting the interference component is started before synchronization is achieved. By starting the interference detection without waiting for synchronization to be achieved, rather than following the synchronization, then the interference detection is no longer dependent on the synchronization being achieved.

11 Claims, 9 Drawing Sheets

(51) Int. Cl.
*H04B 1/16* (2006.01)
*H04B 1/10* (2006.01)

(56) References Cited

OTHER PUBLICATIONS

International Search Report issued in corresponding International application No. PCT/EP2011/060900, date of mailing Aug. 4, 2011.
Written Opinion of the International Searching Authority issued in corresponding International application No. PCT/EP2011/060900, date of mailing Aug. 4, 2011.

Kelleci, Burak et al., "Narrowband Interference Suppression in Multi-Band OFDM Ultra Wideband Communication Systems: A Mixed-Mode Approach," Digital Signal Processing Workshop, 12th Signal Processing Education Workshop, 4th IEEE, PI, Sep. 1, 2006, pp. 55-59, XP031033437, ISBN: 978-1-4244-3534-0.

ECMA International; "High Rate Wideband PHY and MAC Standard"; Standard ECMA-368, 2nd Edition; [downloaded from internet at www.wimedia.org on Oct. 1, 2014]; Dec. 2007; pp. 1-344.

* cited by examiner

SYNCHRONIZING AND DETECTING INTERFERENCE IN WIRELESS RECEIVER

FIELD OF THE INVENTION

This invention relates to methods of operating a wireless receiver to receive a useful signal in a particular band of frequencies in spite of interference components inside the particular band of frequencies. It also relates to corresponding wireless receivers, and to equipment incorporating such wireless receivers such as transceivers and to wireless systems as well as to a computer program product for carrying any of the methods of the present invention.

BACKGROUND

It is known that operation of wireless receivers for various frequency bands can be affected by interference components of different types, narrow band or broad band. For example the operation of a wideband system like WiMedia based UWB (Ultra Wide Band) receiver systems can get corrupted by the presence of harmonics from nearby narrowband devices. Due to the wideband nature of UWB system, these harmonics may co-occupy the frequency band with UWB systems. It is proposed that systems like UWB systems estimate these in-band narrowband interferences (NBI) and suppress the spectrum where there is likelihood of these interferences. NBI estimation is done using spectral analysis of the input signal in the digital baseband. This step allows for the estimation of the interferences which are in the frequency band of the UWB devices.

It is known from WO2009114123A2 to have a wideband signal processing apparatus for software defined radio that can include a transceiver configured to receive a UWB signal via an antenna. A spectrum analyzer provides a characterization of the UWB signal, which may be used to set a reconfigurable band-reject filter (BRF) to null detected interferers. The centre frequency and the quality factor of the BRF can be controlled.

It is known from US2010/0067629 to detect interference using channel estimation features, which are demodulated in the frequency domain after synchronization and conversion to the frequency domain. It is known from US2005/0018750 to detect power per sub band in a single carrier pulse radio UWB system.

SUMMARY OF THE INVENTION

An object of the invention is to provide methods of operating a wireless receiver to receive a useful signal in a particular band of frequencies in spite of interference components inside the particular band of frequencies, as well as to provide corresponding wireless receivers, and equipment incorporating such wireless receivers such as transceivers as well as wireless systems.

According to a first aspect, the invention provides: a method of interference detection in a wireless receiver for receiving a signal having a wanted component and a possible in-band interference component, and involving detecting the interference component in the received signal if there is such a component. A band reject filter is controlled according to the detected interference component to filter the received signal to suppress the interference component, and the receiver is synchronized to the received signal. The step of detecting the interference component can be and preferably is started before synchronization is achieved. By starting the interference detection without waiting for synchronization to be achieved, rather than following the synchronization, the interference detection is no longer dependent on the synchronization being achieved. Hence, the interference detection can be carried out in worse signal conditions than was possible before.

Another aspect provides corresponding synchronization circuitry for a receiver, for receiving a signal having a wanted component and a possible in-band interference component, the receiver having a tunable band reject filter for filtering the received signal, the circuitry comprising an interference detector for detecting the interference component in the received signal if there is such a component and a filter controller for controlling the band reject filter according to the detected interference component, to suppress the interference component. The circuitry also has a synchronizer for synchronizing the receiver to the received signal, wherein the detector is arranged to start detecting the interference component before the synchronization is achieved.

Another aspect provides a wireless receiver having such circuitry. Another aspect provides a computer program for a receiver and having instructions which when executed by a processor in the receiver cause the processor to carry out the above method. The computer program may be stored on any suitable non-transitory signal storing means such as an optical disk such as a CD-ROM or a DVD-ROM, a magnetic disk such as a diskette or a hard drive, magnetic tape storage, solid state storage such as a USB memory etc.

Embodiments of the invention can have any other features added, or disclaimed from these aspects, and some such additional features are set out in dependent claims and described in more detail below.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Elements or parts of the described receivers may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

References to interference components can encompass any type of interference, narrow band or broadband, continuing or intermittent, or to any part of the interference.

References to receiving are intended to encompass down-shifting frequencies to baseband, or distinguishing a band of frequencies, according to the context.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may do. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In some instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

Introduction to Some Issues Addressed by the Embodiments.

It has now been appreciated that wireless receivers including those for wideband systems like UWB systems can also suffer due to inaccurate detection of in-band interference components. They can be applied in for example Narrowband interference (NBI) mitigation, OFDM, Wimedia based UWB, Wireless USB, media-access-control (MAC), Cognitive radio, and so on. The output of the detection can be used to tune a BRF such as a notch filter, to cancel the affect of the NBI. Alternatively or as well, the output of this detection mechanism can also be used for mitigation in other ways, such as by optimization of communication resources like data rate, carrier frequency etc at the transmitter side. The FCC and ITU-R define UWB in terms of a transmission from an antenna for which the emitted signal bandwidth exceeds the lesser of 500 MHz or 20% of the centre frequency. Thus, pulse-based systems—wherein each transmitted pulse instantaneously occupies the UWB bandwidth, or an aggregation of at least 500 MHz worth of narrow band carriers, for example in orthogonal frequency-division multiplexing (OFDM) fashion—can gain access to the UWB spectrum. Unlicensed use of UWB can be in the range of 3.1 to 10.6 GHz. The useful signal information can be modulated on UWB pulses by encoding the polarity of the pulse, the amplitude of the pulse, and/or by using orthogonal pulses. UWB pulses can be sent sporadically at relatively low pulse rates to support time/position modulation, but can also be sent at rates up to the inverse of the UWB pulse bandwidth. UWB systems tend to be short-range and indoors applications. However, due to the short duration of the UWB pulses, it is easier to engineer extremely high data rates, and data rate can be readily traded for range by simply aggregating pulse energy per data bit using either simple integration or by coding techniques. Conventional OFDM (Orthogonal Frequency Division Multiplexing) technology can also be used.

How a wideband system like WiMedia-based UWB can get interference from narrowband devices which operate in its close proximity will now be discussed. These narrowband interferences can co-occupy the frequency spectrum with a UWB system. The effect of such problems on UWB receiver and possible solutions are known and more details can be obtained from Kelleci, B.; Fischer, T. W.; Shi, K.; Yi Zhou; Karsilayan, A. I.; Serpedin, E.; "Narrowband Interference Suppression in Multi-Band OFDM Ultra Wideband Communication Systems: A Mixed-Mode Approach", (Digital Signal Processing Workshop, 12th-Signal Processing Education Workshop, 4$^{th}$, Issue Date: 24-27 Sep. 2006 page(s): 55-59, Teton National Park, Wyo., ISBN: 1-4244-3534-3).

The known solutions adopt a two step approach and involve the suppression of the unwanted interferences by using notch filters. A first step deals with interference estimation for tuning of notch filters and a second step involves suppressing the interference using notch filters. As will be explained in next section, these solutions can combat the interferences which are in the band of the UWB system. Problems from inaccurate detection and their effects can also be understood from the following discussion of a more detailed example.

In Band Interference Suppression

To overcome the problems due to in-band narrowband interferences, it is known to suppress the unwanted interferences by using BRFs. This approach uses FFT as a rough spectrometer to analyze the spectrum of incoming signal for interference detection. The input sampling rate of FFT blocks is corresponding to the bandwidth of the system. The ADC uses a higher sampling rate to ease the requirements of analog baseband filtering and is generally followed by a downsampler so that the rest of the digital baseband functions at a lower sampling rate. Therefore, the sampling rate at an FFT block is lower than the sampling rate of the ADC. By using this approach, the FFT performs the spectrum analysis on the frequency band corresponding to bandwidth of the UWB signal (528 MHz). The ADC output is first downsampled before further baseband processing. A power detector is placed just after the ADC, and measures the power of incoming samples. This measurement is used as an input to a gain control part (AGC). This ensures that the analog input signal fits into the maximum signal range supported by the ADC and hence, does not suffer from clipping at ADC. Such current solutions do not take into account the problems due to poor detection of interference caused by loss of synchronization.

For instance, suppose a UWB device is close to other wireless systems such as GSM, WLAN systems etc. which may or may not be causing interference to UWB at all time instants. In this case, it is important for UWB device to dynamically employ an interference combating strategy.

Figure 1:
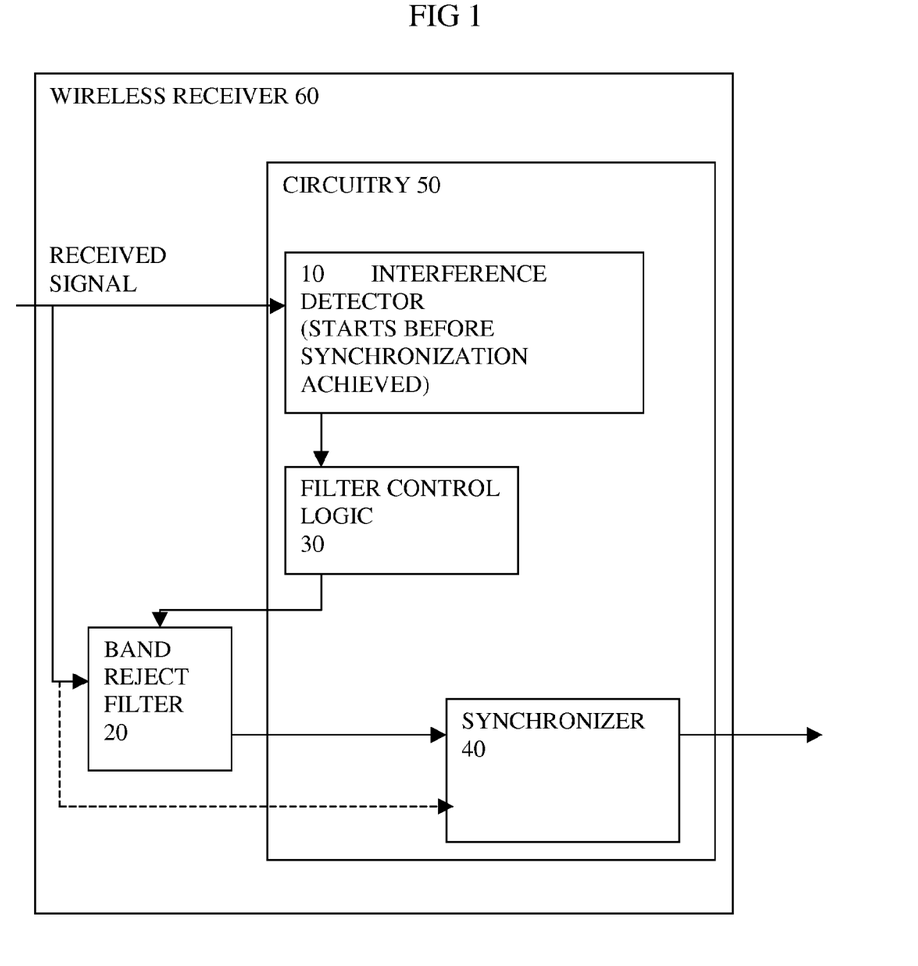
FIG. 1 shows a schematic view of a first embodiment of the present invention.
Figure 2:
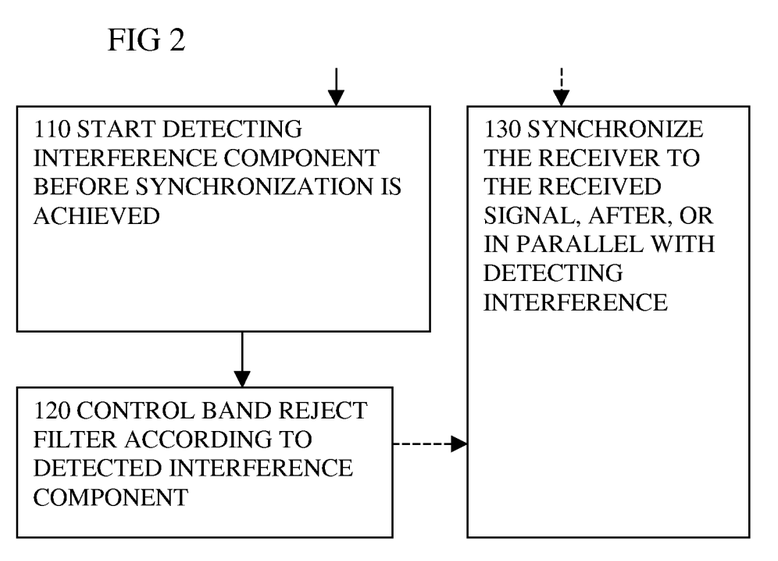
FIG. 2 shows a schematic view of steps of another embodiment of the present invention.

FIGS. 1,2 A First Embodiment of the Invention

FIG. 1 shows a schematic view of some features of a wireless receiver 60 having circuitry 50 according to an embodiment. Many other features may be added. The circuitry has an interference detector 10 for detecting a possible interference component in the received signal. This can start detecting before synchronization of the wireless receiver to the received signal is achieved by a synchronizer 40. The detected interference is used by a filter control logic part 30 to control a band reject filter 20 to suppress the detected interference. The synchronizer 40 can work on either the unsuppressed received signal, or on the received signal after the detected interference has been suppressed.

In FIG. 2, steps in operating a wireless receiver such as that of FIG. 1, or other embodiments are shown. At step 110 interference detection starts before synchronization is achieved. At step 120, the band reject filter is controlled to suppress the detected interference according to the detection. In principle this control could be as simple as switching on preset filter, having a preset band and a preset level of attenuation, or it could have any level of complexity, such as dynamic control of attenuation level, centre frequency, band width and so on. At step 130, the receiver is synchronized to the received signal, either after the detection of interference, or in parallel with the detection.

By having the interference detection start before synchronization is achieved, the detection can be independent of the success of the synchronization and hence some types of interference can be detected more reliably even if the synchronization fails, and the wireless receiver can therefore be more robust to such noise.

Some Additional Features:

Some additional features are as follows, others can be envisaged:

The synchronizing step can be carried out at least partly on the filtered received signal. By synchronizing on the filtered received signal, the suppression of the detected interference means the synchronization can therefore also be carried out in worse signal conditions than before. This can enable the receiver operation to have more tolerance of interference. The synchronizing can start before suppression is complete, or can start only after suppression is complete, either way at least part of the synchronizing benefits. The synchronizing step can be carried out in series, following the steps of detecting the interference component and filtering. This can help ensure the synchronizing does not start until any interference is suppressed, and can result in a simpler implementation.

The synchronizing step can be carried out in parallel with the step of detecting the interference component. This can enable the synchronizing to be started sooner, without waiting for the interference detection as in the series case, so may improve synchronization in some cases, though at the expense of more complexity. If the synchronizing can start without waiting for the filtering, it can continue once the filtering starts.

The step of controlling of filtering can involve adjusting an analog notch filter according to the detected interference. This can provide earlier filtering and so enable any conversion to digital domain to be improved and have less quantisation noise. Hence this can be more effective filtering than digital filtering in some cases, or can be combined with such digital filtering.

The method can have the step of adjusting a gain of the received signal following the filtering step. The gain may sometimes be increased once the interference is suppressed, which is particularly useful to reduce quantisation noise following any conversion to digital signals for example.

The method can have the step of detecting clipping, and adjusting a gain according to the clipping detection. This enables the gain to be adjusted more accurately to reduce the quantisation noise when the signal is converted to digital form.

The interference detection can involve carrying out a spectral assessment of the interference, and tuning a centre frequency of the band reject filter according to the spectral assessment of the interference. The spectral assessment can enable dynamic interference at different frequencies be found and suppressed as well as interference having a predetermined frequency.

The method can have the step of digital decimation filtering the received signal, and the step of detecting interference being carried out on the decimation filtered signal. This can enable a reduced data rate and thus enable simpler or more cost effective hardware to be used.

The received signal can comprise two or more sub carriers, and the interference detection comprise determining a power for one or more of the sub carriers with respect to an average power of a wider group of the subcarriers. This is one way of detecting which is particularly convenient and enables relatively precise location of the interference.

The circuitry can have the synchronizer being arranged to use the filtered received signal. The circuitry can have the synchronizer being arranged in series with the interference detector, so that the synchronizing follows the detecting of the interference component and the filtering. Or the circuitry can have the synchronizer being arranged in parallel with the interference detector, so that the synchronizing need not wait for completion of the detecting of the interference component and the filtering. The circuitry can have a digital decimation filter for filtering the received signal, with the interference detector being arranged to use an output of the decimation filter.

Figure 3:
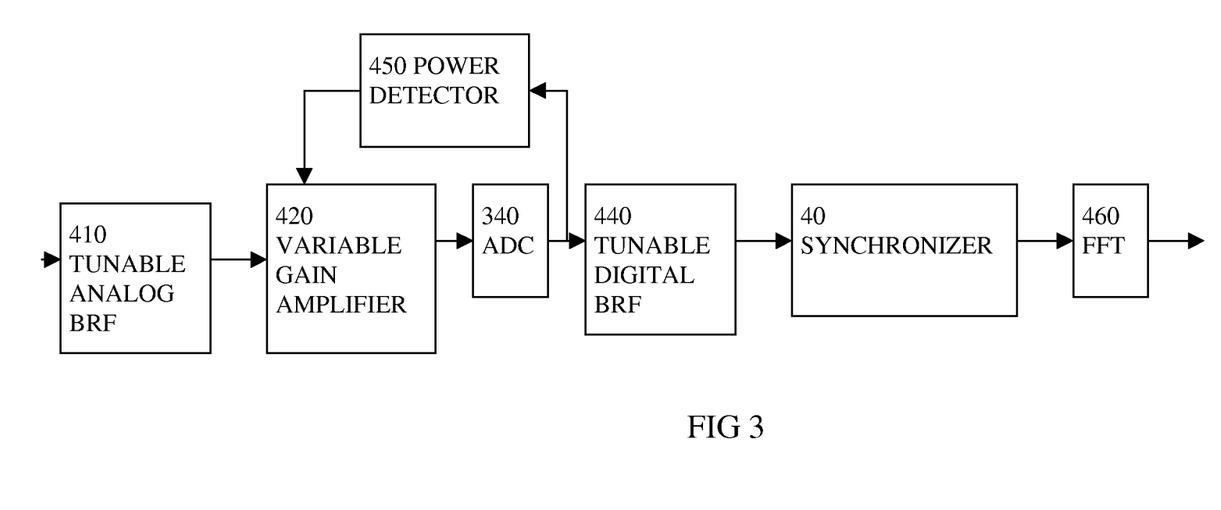
FIG. 3 shows a schematic view of another embodiment of the present invention, FIG. 4 schematic view of a wireless receiver according to an embodiment of the present invention having analog BRF and gain control, and digital FFT and logic.

FIG. 3, Schematic View of Another Embodiment

FIG. 3 shows another embodiment showing a possible division between analog and digital domains. Other variations are possible. In this embodiment, a tunable analog band reject filter 410 feeds a variable gain amplifier 420. This is followed by an ADC 340. A power detector 450 uses the output of the ADC and feeds back a gain control signal to the amplifier 420. The ADC output is also fed to a synchronization circuit 40, via a tunable digital band reject filter 440. Interference detection can in principle be carried out in analog or digital domain and controlled so as not to await the completion of synchronization. The tunable analog band reject filter (BRF) is positioned to be able to filter interference out of the incoming signal before going into the ADC and its AGC loop. This way, the power detector will see less of the interference and more of the UWB signal power. Because of that, the gain adjustment of the VGA will be more based on the UWB signal, making more bits of ADC available for the UWB signal. This will lead to lower quantization noise due to the interference. The tunable digital BRF is optional and can further suppress the interference to provide extra protection to the correlation operations in the various synchronization phases. The nulling of the subcarriers in the frequency domain is a possible final stage of interference suppression. The data transmitted on the subcarriers affected by the interference is lost, so the best thing to do is to set the affected subcarriers to zero and thereby eliminating any possible contribution to a LLR. Note that setting a subcarrier to zero is equivalent to a BRF with the bandwidth of one subcarrier.

Figure 4:
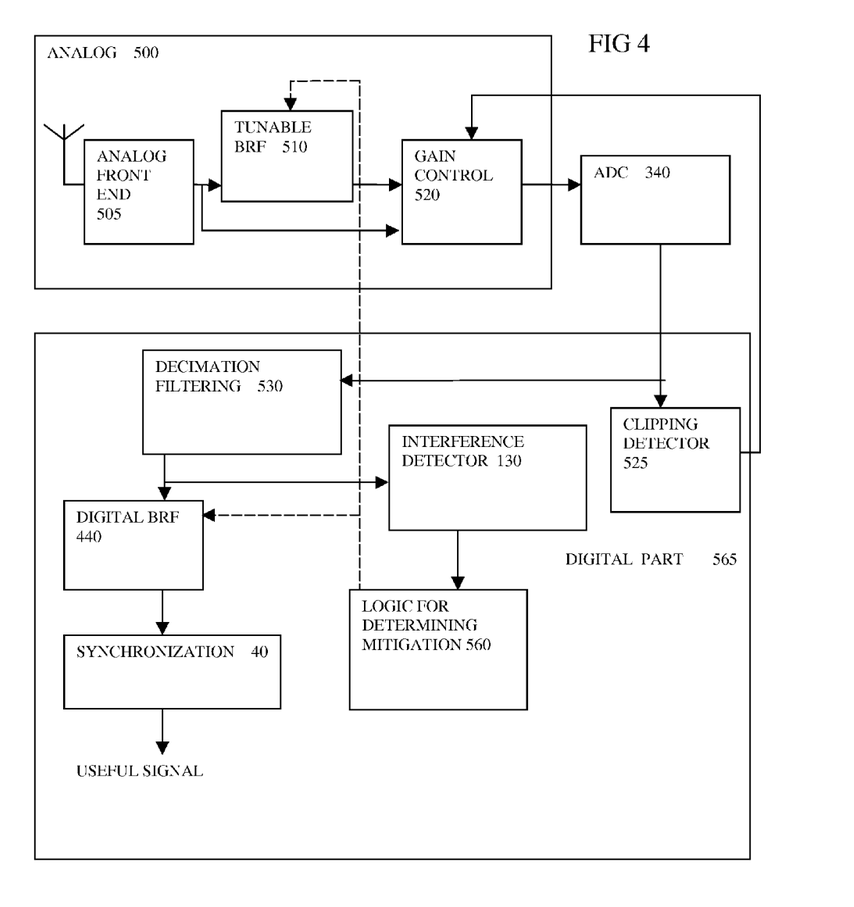

FIG. 4 Schematic View of a Wireless Receiver According to an Embodiment Having Analog BRF and Gain Control, and Digital FFT and Logic In FIG. 4, a schematic view of an example of a receiver shows an analog part 500 and a digital part 565. In the analog part is an antenna feeding an analog front end 505. This can include the mixer and LO, adaptable to receive a different range of frequencies, or could incorporate other ways of adapting the range of frequencies. The front end feeds a tunable BRF 510. The front end typically has a bandpass filter for anti aliasing, and the BRF can be implemented as part of this circuit. This feeds a gain control part 520. The output of this is fed to the ADC 340. The BRF optionally has a bypass path so that it is switched out during detection of the interference, and may stay switched out if no interference is detected. The ADC feeds digital signals to the digital part 565. This can include a clipping detector 525, coupled to provide feedback to the gain control part. The digital part can also include a digital BRF 440, a part for decimation 530 to reduce the sample rate for the digital BRF. The interference detector can have an FFT part to form a spectral analyzer for use in the interference detector 130. Other logic can process the resulting spectrum to detect the interference. Further logic 560 is used for determining mitigation of the interferences detected.

This mitigation can involve feedback to tune the tunable BRF, or the digital BRF, or can take other forms, such as feedback to a transmitter to determine which subcarriers to use for example. The output of the synchronizer can be a synchronized received signal for further processing to decode the transmitted data for example.

The ADC can in one example have an output at a rate of 1 Gsps, and the decimation filter have an output at 528 Msps which is fed to the interference detector. This can comprise a 128 point FFT, giving a spectrum resolution of 4.125 MHz, for further processing to determine where the interferers are in terms of frequency and how strong they are, from the frequency domain information. Other speeds and rates can be chosen as appropriate. This can enable mitigation to be controlled for example by sending a BRF control signal back to the analog part. More details of a possible implementation of the NBI estimation part are explained below with reference to FIG. 10. The 1 Gsps output of the ADC can also be used by the clipping detector 525 in the form of a power detector having an output compared with a threshold to determine if clipping is occurring. As before, it returns a signal to the analog part for use in gain control.

Figure 5:
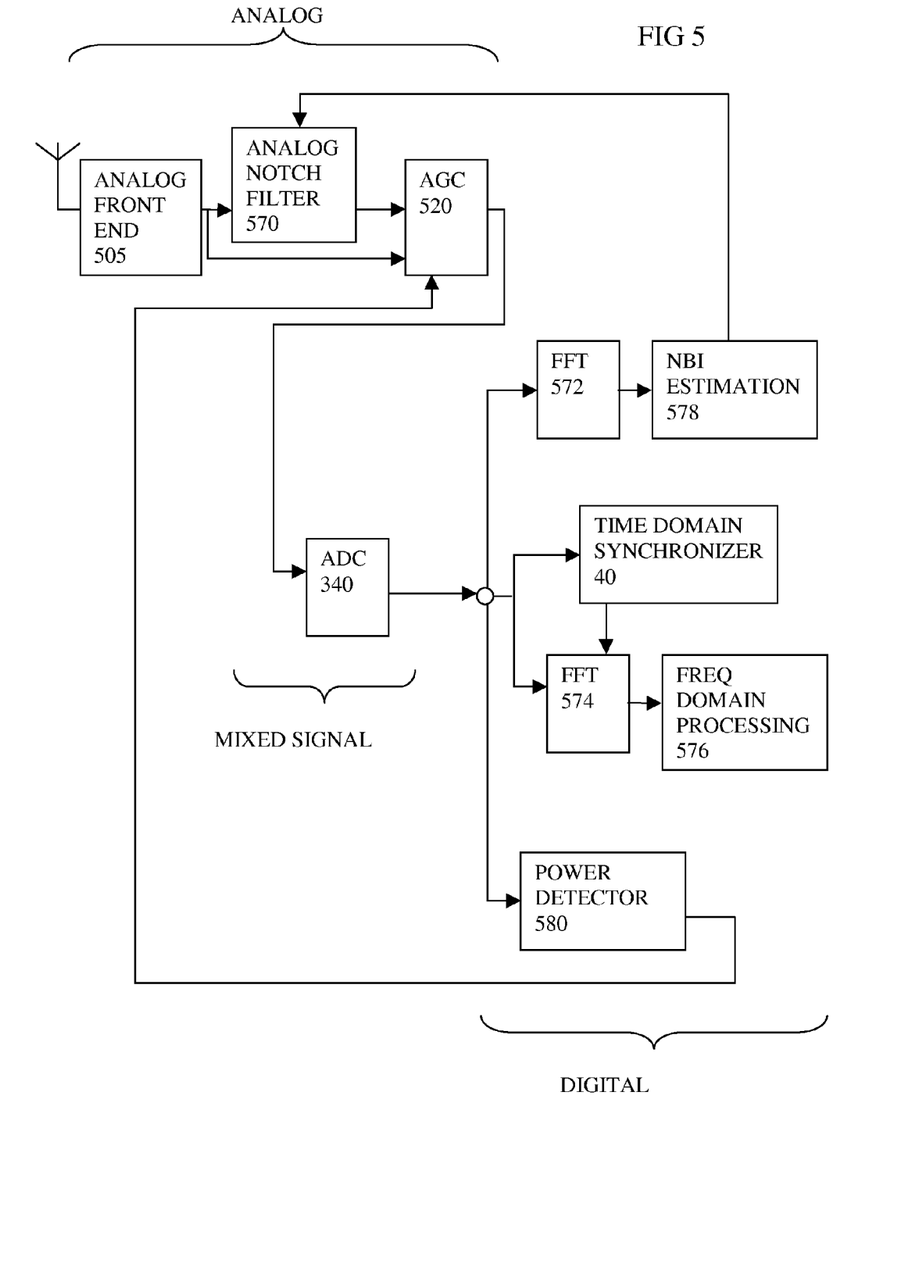
FIG. 5 shows a schematic view of another embodiment of the present invention.

FIG. 5, Schematic View of Another Embodiment

FIG. 5 shows a block level diagram to illustrate the basic signal processing blocks or functions for interference detection and mitigation according to an embodiment using the methodology described above. In the example of FIG. 5, an analog front end 505 receives a signal from an antenna, and is followed by an automatic gain control part AGC 520. Then a band pass filter in the form of an analog notch filter 570 is shown, controlled according to the detected NBI. An analog to digital part 340 feeds samples to four paths. A first path is used for interference detection, in this case using an FFT 572, followed by logic 578 for NBI estimation based on finding peaks in the spectrum output by the FFT part.

A second path has a time domain synchronizer 40. This feeds a timing signal to a second FFT 574, used in a third path for outputting a frequency domain signal such as a sequence of samples representing power at different frequencies. Although shown as having two FFT devices, in practice, these two functions can reuse the same FFT circuitry. This is fed to a frequency domain processing part 576 used for frequency domain synchronization, and in some cases for band reject filtering by means of tone nulling. A fourth path can be used for a power detector 580 for use in signal detection, and clipping detection for use in controlling the AGC setting.

NBI-estimation can be done by first estimating the energy output of each FFT-bin and comparing it against the average energy of all FFT-bins. The advantage of this non coherent energy based detection in frequency domain is low complexity and ease of implementation in ASIC based solution.

Operating a wireless receiver according to an embodiment can involve determining whether the detected interference is sufficient to influence the gain control. This can involve comparing the interference to a threshold, or comparing it to a maximum power detected in the band. If needed, the interference is suppressed by tuning the BRF according to the frequency of the interference. As an analog filter has a power consumption penalty, some power can be saved if the filter is switched in only when needed. Any distorting effect of the filter can also be reduced if the filter is switched in only when needed. Then gain control is carried out after the suppression, so that the gain can be maximized, to reduce quantization error in the ADC.

Figure 6:
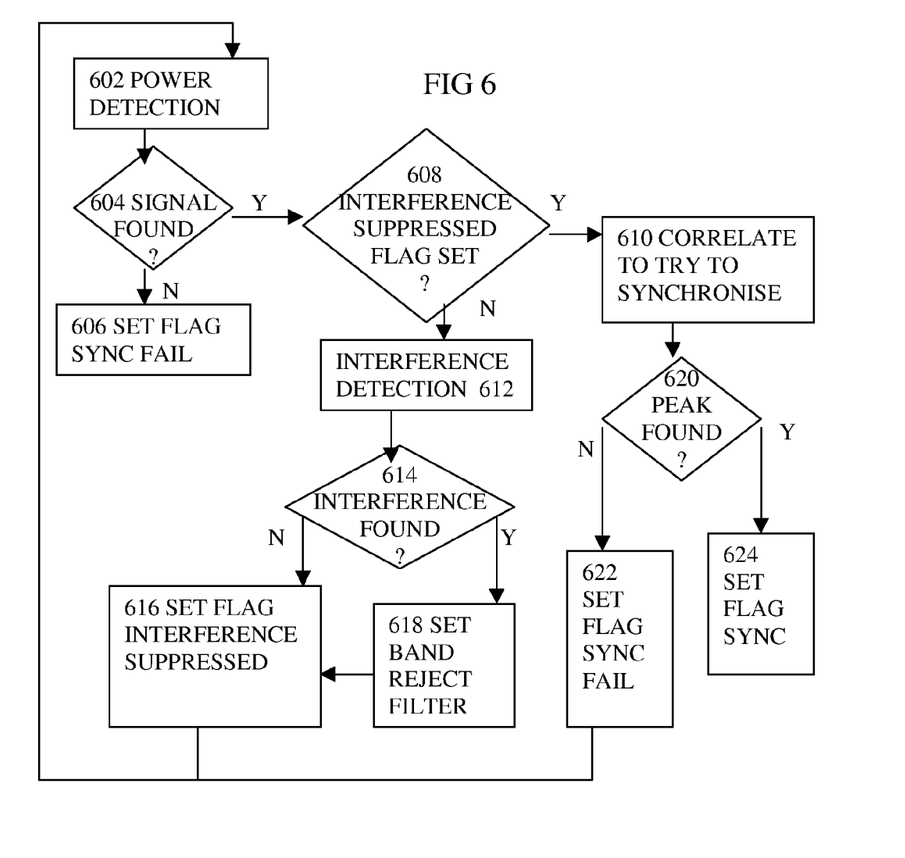
FIG. 6 shows a flow chart for detection then synchronization in series.

FIG. 6, Flow Chart for Series Detection then Synchronization

FIG. 6 shows a flow chart for the operation of circuitry according to an embodiment involving interference detection then synchronization in series. At step 602, power detection is carried out to determine if a signal is being received, at step 604. If no, then at step 606 a sync fail flag is set. At step 608, if yes, then the question of whether the interference suppressed flag is already set is checked. If not, then interference detection is carried out at step 612. This could use the process of FIG. 10, or some other process. At step 614, if no interference is found, the interference suppressed flag is set at step 616, and the process loops back to step 602. At step 618, if interference is found, the band reject filter is controlled to suppress the detected interference. This can involve any degree of control as appropriate. Again the process loops back to step 602. If the notch filter is found to be tuned at step 608, then the process moves on to synchronization by trying to correlate the incoming sequence of values with a known sequence, or with a time shifted version of itself, at step 610. If a correlation peak is not found at step 620, then a sync fail flag is set at step 622, and the process loops back again to step 602. If a correlation peak is found, then a sync flag is set and the process can end, or can continue again for the next received packet.

Figure 7:
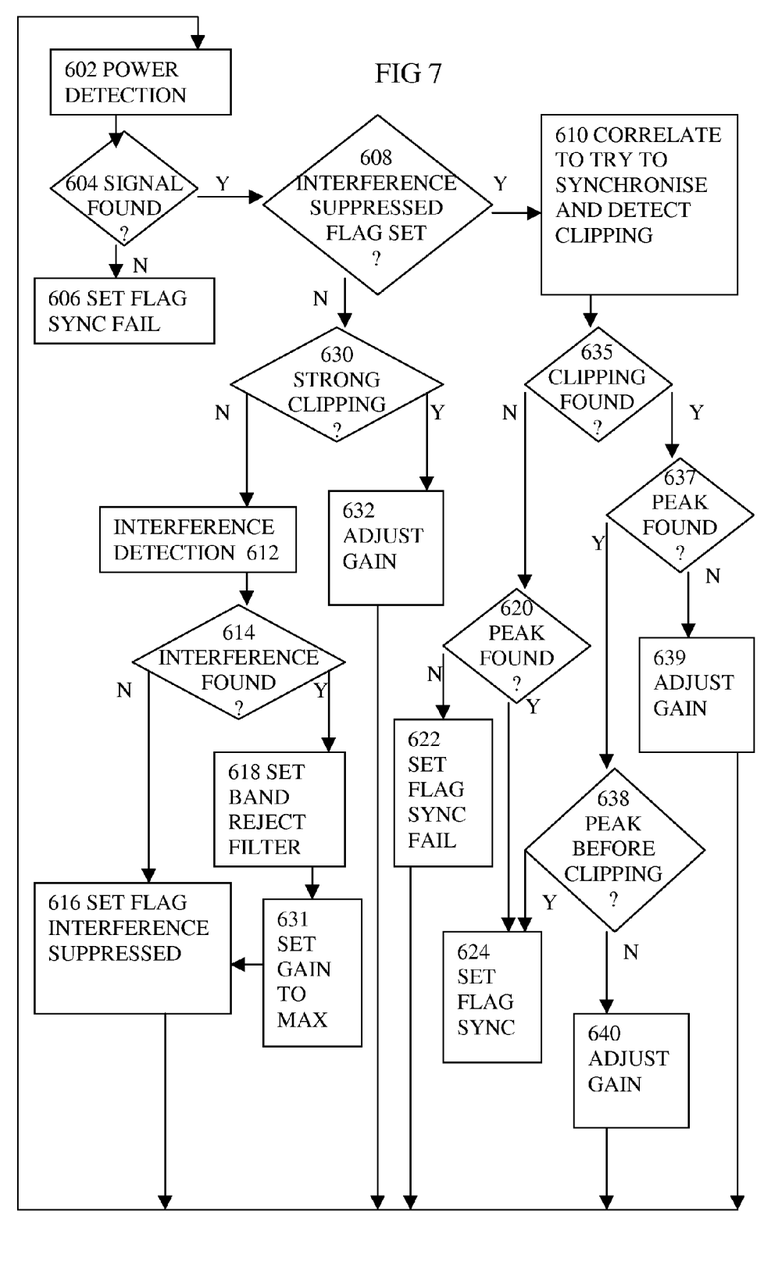
FIG. 7 shows a flow chart for detection in series with synchronization, with clip detection and gain control.

FIG. 7, Flow Chart for Series Detection then Synchronization with Clip Detection and Gain Control This figure shows a similar flow chart as that of FIG. 6, but with gain control. This means that before the interference detection at step 612, it is queried at step 630 whether there is strong clipping at the ADC. If not the process continues as before except that after setting the band reject filter at step 618, the gain is set to max at step 631, and subsequently iteratively reduced by steps 630 and 632. If clipping is found, then gain is adjusted at step 632, and the process loops back to step 602. Also, after the step 618 of setting the band filters, the gain is set to maximum, and reduced iteratively by step 632, until there is no strong clipping. Also, during synchronization, clipping detection is carried out and it is queried after step 610 whether clipping is found at step 635. If no and if a correlation peak is found at step 620, then a synchronization phase is completed and a flag is set at step 624. If yes, clipping is found at step 635, and no correlation peak is found at step 637, indicating synchronization failed, then gain is adjusted down at step 639 and the process loops back to step 602. Otherwise, if a peak was found at step 637, a further query is made as to whether the peak occurs prior to the clipping, at step 638. This might suggest the disruption causing by the clipping is no longer significant. If not then gain is adjusted at step 640 and the process loops back to step 602. Otherwise, if the peak is prior to the clipping then the synchronization is completed and the appropriate flag can be set at step 624 and the process can end, or can continue again for the next received packet.

Figure 8:
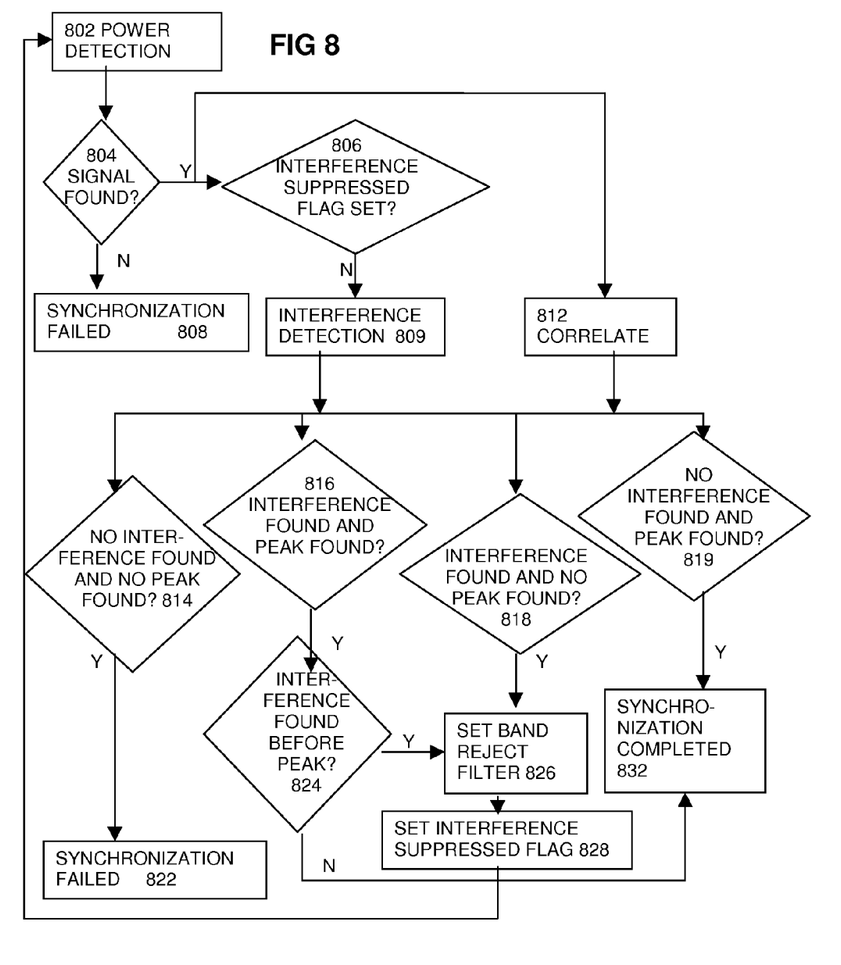
FIG. 8 shows a flow chart for detection and synchronization in parallel.

FIG. 8, Flow Chart for Parallel Detection and Synchronization

FIG. 8 shows another flow chart similar to that of FIG. 6, but in this case the synchronization does not await the detection, the two go ahead in parallel. At step 802, power detection is carried out, and if a signal is not found at step 804, synchronization is declared failed at step 808. If a signal is found, then if the interference suppressed flag is found at step 806 to be not set, then interference detection is carried out at step 809. At the same time, synchronization by means of correlation at step 812 is carried out. Four possible conditions can arise from the two parallel processes. If there is no interference and no correlation peak found at step 814, then synchronization is declared to have failed at step 822. A second of the four conditions is that interference is found and a correlation peak is found at step 816. In this case, it is queried whether the interference is found before the peak at step 824, suggesting the interference is causing or disrupting the correlation. If so, the band reject filter is set at step 826 and the interference suppressed flag is set at step 828, then the process loops back to step 802. Otherwise, synchronization is marked as completed at step 832 and the process can end, or can continue again for the next received packet.

In a third of the four conditions, it is queried whether interference is found, but no correlation peak, at step 818. If so, then the band reject filter is set at step 826 to suppress the interference and the interference suppressed flag is set at step 828. Then the process loops back to step 802. In a fourth of the conditions, it is queried at step 819 whether no interference is found, but a correlation peak is found. In this case, synchronization is marked as completed at step 832 and the process can end, or can continue again for the next received packet.

Figure 9:
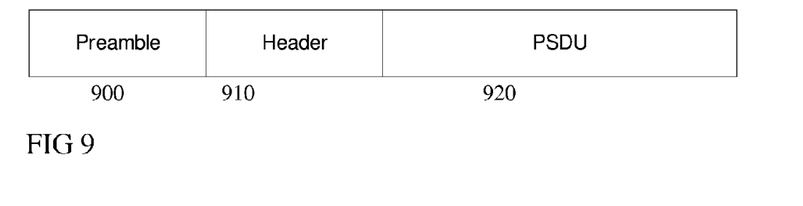
FIG. 9 shows a UWB Packet structure.

FIG. 9 UWB Packet Structure, NBI Detection Using Preamble Symbols

Some embodiments involve detecting the presence of narrowband interference in wideband communication system like WiMedia based UWB as described. In UWB system, communication is done in the form of communication packets having a structure as shown in FIG. 9. The detail of UWB packet structure can be found in for example High Rate Ultra Wideband PHY and MAC Standard", ECMA-368 $2^{nd}$ edition, December-2007, or from the WiMedia Alliance at www.wimedia.org, in the Multiband OFDM physical layer specification.

Each packet is composed of three components: PLCP (Physical Layer Convergence Protocol) preamble 900, PLCP header 910 and PSDU (PLCP Service Data Unit) 920. The preamble part aids the receiver in timing synchronization, carrier-offset recovery, and channel estimation. It consists of a time-domain sequence and a frequency-domain sequence. The time-domain sequence is used for timing synchronization and carrier offset recovery and the frequency-domain sequence is used for channel estimation in frequency domain (after FFT). Depending on the synchronization and carrier-offset recovery algorithm, the number of samples consumed may be less than the actual length of synchronization sequence length. So, the rest of these samples can be used to perform additional tasks to support other functionality in the system. Hence it is possible to use this initial part of synchronization sequence to estimate the characteristics of NBI. So, interference detection can be carried out as part of, or before the synchronization operation and can be repeated for every packet as it is received, to enable more dynamic detection of NBI. In some embodiments, the gain can be adjusted before NBI detection, then readjusted if necessary after the suppression by the band reject filter, to enable an improved signal to be passed to the synchronization part.

Figure 10:
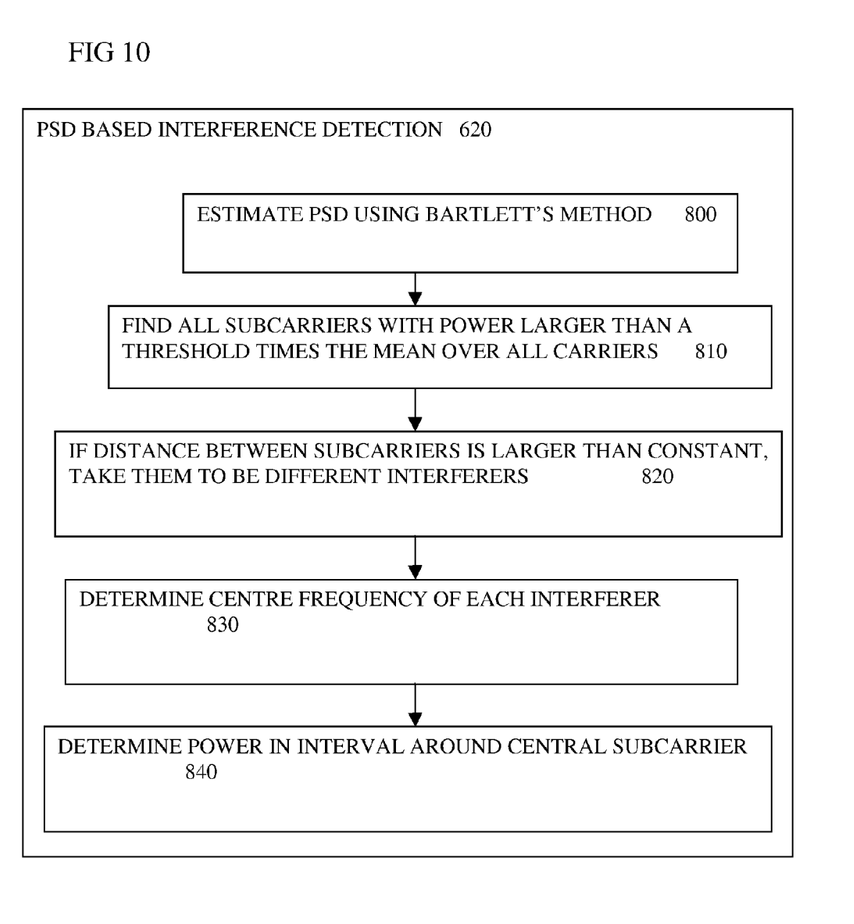
FIG. 10 shows steps in interference detection in the embodiments of the present invention.

FIG. 10, Steps in Interference Detection in the Embodiments,

In FIG. 10, steps involved in an example of an implementation of the interference detection of step 110 of FIG. 2 or other embodiment are shown. Other examples could be envisaged. At step 800, the PSD is estimated from the FFT output using Bartlett's method. At step 810 all the subcarriers with a power larger than a threshold times the mean over all carriers are found. At step 820, if the distance in frequency between subcarriers over this power is larger than a constant, they are taken to be separate interferers. At step 830, a centre frequency of each interferer is determined. Then a power in the interval around the central subcarrier is determined at step 840.

UWB Examples

Two examples of ways to implement the interference detection for UWB are as follows. A first method is to combine the interference detection with the synchronization, here in conjunction with the normal synchronization operations the interference detection is performed on the spectrally flat synchronization sequence. In the first band the synchronization and interference detection starts, and once the OFDM symbol timing is recovered, the hopping to the other band can be done in order to fine tune the gains for those bands and to detect the interference there as well. If needed, the analog BRF will be engaged in the first band to be able to get to the recovery of the symbol timing. After all bands have been visited, the results of the interference can be combined and filters set accordingly.

A further attempt to make synchronization more robust could involve using an empty MAS (MAC allocation slot). This is a period of time in which there are no packets to be received. In this period the interference detection can be done for all bands, so the needed BRF filter settings are available when synchronization needs to start. As UWB involves hopping between neighbouring bands within a band group, an overall goal is to detect artifacts in any band caused by interferers in neighbouring bands in the group. Therefore a map of such interferers and artifacts can be built up in the course of visiting all the bands, regardless of the order in which they are visited.

Implementations of Circuitry

Some of the method steps discussed above for detecting interference, determining parameters, synchronizing by correlation or controlling filters or amplifiers for example, may be implemented by logic in the form of hardware or, for example, in software using a processing engine such as a microprocessor or digital signal processor or a programmable logic device (PLD's) such as a PLA (programmable logic array), PAL (programmable array logic), FPGA (field programmable gate array).

An example of a circuit with an embedded processor will be described for use in a mobile radio telephone receiver/transceiver. This circuit may be constructed as a VLSI chip around an embedded microprocessor such as an ARM7TDMI core designed by ARM Ltd., UK which may be synthesized onto a single chip with the other components shown. Alternatively other suitable processors may be used and these need not be embedded, e.g. a Pentium processor as supplied by Intel Corp. USA. A zero wait state SRAM memory may be provided on-chip as well as a cache memory for example. Typically I/O (input/output) interfaces are provided for receiving and transmitting data to the relevant networks, e.g. a data or speech information, wireless or cable networks. FIFO buffers may be used to decouple the processor from data transfer through these interfaces. The interface can provide network connections, i.e. suitable ports and network addresses, e.g. the interfaces may be in the form of network cards. One interface can provide a wireless front end for receiving wireless transmissions from a wireless network.

Software programs may be stored in an internal ROM (read only memory) and/or on any other non-volatile memory, e.g. they may be stored in an external memory. Access to an external memory may be provided by an external bus interface if needed, with address, data and control busses. The method and receiver of embodiments of the present invention may be implemented as software to run on a processor. In particular a receiver in accordance with embodiments may be implemented by suitable programming of the processor. The methods and procedures described above may be written as computer programs in a suitable computer language such as C and then compiled for the specific processor in the embedded design. For example, for the embedded ARM core VLSI described above the software may be written in C and then compiled using the ARM C compiler and the ARM assembler.

The software has code, which when executed on a processing engine provides the methods and the interference controller of the present invention. The software programs may be stored on any suitable machine readable medium such as magnetic disks, diskettes, solid state memory, tape memory, optical disks such as CD-ROM or DVD-ROM, etc.

Concluding Remarks

As has been described, an UWB transceiver could be used in a cell phone. Inside a cell phone there will be more transceivers from other systems such as cellular (GSM, UMTS, (W)CDMA) and connectivity systems (WLAN, BT). Most of these systems use spectrum specifically assigned to them and which doesn't overlap with the spectrum in which UWB is active. However this doesn't mean that these systems do not interfere with the UWB operation. Higher harmonics of the intended signals of the other systems are generated because of non perfect power amplifiers and transmit filters. Due to the power level of these higher harmonics and the close proximity of the transmitters to the UWB receiver, the higher harmonics will be picked up by the UWB receiver. The exact amount of energy that will affect the UWB receiver is hard to analyze. This is due to unknown non-linearities of the other systems and antenna coupling between the transmit antenna of the other systems and the UWB receiver.

A method of interference detection involves detecting (110) the interference component in the received signal if there is such a component, controlling (120) a band reject filter according to the detected interference component to filter the received signal to suppress the interference component, and synchronizing (130) the receiver to the received signal, wherein the step of detecting the interference component is started before synchronization is achieved. By starting the interference detection without waiting for synchronization to be achieved, rather than following the synchronization, then the interference detection is no longer dependent on the synchronization being achieved. Hence, the interference detection can still be carried out in worse signal conditions than was feasible before.

Other variations can be envisaged within the scope of the claims.

The invention claimed is:

1. A method of interference detection in a wireless receiver for receiving a signal having a wanted component and a possible in-band interference component, the method comprising the steps of:
   digital decimation filtering the received signal;
   detecting the interference component in the received signal if there is such a component,
   controlling a band reject filter according to the detected interference component to filter the received signal to suppress the interference component,
   adjusting a gain of the received signal following the filtering step, and
   synchronizing the receiver to the received signal in parallel with the step of detecting the interference component, wherein the step of detecting the interference component is started before synchronization is achieved and is carried out on the decimation filtered signal.

2. The method of claim 1, the synchronizing step being carried out at least partly on the filtered received signal.

3. The method of claim 1, the step of controlling of filtering involving adjusting an analog notch filter according to the detected interference.

4. The method of claim 1 having the step of detecting clipping, and adjusting the gain according to the clipping detection.

5. The method of claim 1, the interference detection comprising the step of carrying out a spectral assessment of the interference, and tuning a centre frequency of the band reject filter according to the spectral assessment of the interference.

6. The method of claim 1, the received signal comprising two or more subcarriers, and the interference detection comprising determining a power for one or more of the sub carriers with respect to an average power of a wider group of the subcarriers.

7. A computer program for a receiver and having instructions which when executed by a processor in the receiver cause the processor to carry out the method of claim 1.

8. Circuitry for a wireless receiver for receiving a signal having a wanted component and a possible in-band interference component, the receiver having a tunable band reject filter for filtering the received signal, the circuitry comprising:
- a digital decimation filter for filtering the received signal,
- an interference detector for detecting the interference component in the received signal if there is such a component, the interference detector being arranged to use an output of the decimation filter,
- a filter controller for controlling the band reject filter according to the detected interference component, to suppress the interference component, and
- a synchronizer for synchronizing the receiver to the received signal, the synchronizer being arranged in parallel with the interference detector, so that the synchronizing need not wait for completion of the detecting of the interference component and the filtering, wherein the detector is arranged to start detecting the interference component before the synchronization is achieved.

9. The circuitry of claim 8, the synchronizer being arranged to use the filtered received signal.

10. A wireless receiver comprising the circuitry of claim 8.

11. A method of interference detection in a wireless receiver for receiving a signal having a wanted component and a possible in-band interference component, the method comprising the steps of:
- digital decimation filtering the received signal,
- detecting the interference component in the decimation filtered signal if there is such a component,
- controlling a band reject filter according to the detected interference component to filter the received signal to suppress the interference component, and
- synchronizing the receiver to the received signal in parallel with the step of detecting the interference component, wherein the step of detecting the interference component is started before synchronization is achieved.

* * * * *